US012112738B2

(12) United States Patent
Chen et al.

(10) Patent No.: US 12,112,738 B2
(45) **Date of Patent: *Oct. 8, 2024**

(54) HEADPHONE WITH MULTIPLE REFERENCE MICROPHONES ANC AND TRANSPARENCY

(71) Applicant: Apple Inc., Cupertino, CA (US)

(72) Inventors: Hanchi Chen, San Jose, CA (US); Sarthak Khanal, Santa Clara, CA (US); Yang Lu, San Jose, CA (US); Vladan Bajic, San Francisco, CA (US); Esge B. Andersen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,942

(22) Filed: Aug. 16, 2023

(65) Prior Publication Data

US 2024/0046913 A1 Feb. 8, 2024

Related U.S. Application Data

(63) Continuation of application No. 17/901,779, filed on Sep. 1, 2022, now Pat. No. 11,741,939, which is a continuation of application No. 17/022,954, filed on Sep. 16, 2020, now Pat. No. 11,437,012.

(51) Int. Cl.
*G10K 11/178* (2006.01)
*H04R 3/00* (2006.01)

(52) U.S. Cl.
CPC .. *G10K 11/17881* (2018.01); *G10K 11/17854* (2018.01); *H04R 3/005* (2013.01); *G10K 2210/3028* (2013.01); *H04R 2201/10* (2013.01)

(58) Field of Classification Search
CPC ....... G10K 11/17881; G10K 11/17854; G10K 11/17823; G10K 11/17819; G10K 11/17815; G10K 2210/1081; G10K 2210/1082; G10K 2210/3028; G10K 2210/3219; G10K 2201/10; H04R 1/1083; H04R 3/005; H04R 2201/10; H04R 2410/15; H04R 2460/01
USPC ........................... 381/71.6, 71.7, 72, 74, 371
See application file for complete search history.

(56) References Cited

U.S. PATENT DOCUMENTS

| | | | | |
|---|---|---|---|---|
| 8,155,334 B2 * | 4/2012 | Joho | G10K 11/17837 381/71.8 |
| 10,096,313 B1 * | 10/2018 | terMeulen | G10K 11/17885 |
| 11,335,316 B2 * | 5/2022 | Chen | G10K 11/17827 |
| 11,437,012 B2 * | 9/2022 | Chen | H04R 1/1083 |
| 11,741,939 B2 * | 8/2023 | Chen | H04R 1/1083 381/71.2 |
| 2019/0058952 A1 * | 2/2019 | Nawfal | H04R 5/04 |

* cited by examiner

*Primary Examiner* — Xu Mei
(74) *Attorney, Agent, or Firm* — Aikin & Gallant, LLP

(57) ABSTRACT

An ear cup housing has several reference microphones, an error microphone and a speaker. A processor drives the speaker for acoustic noise cancellation and transparency, by processing the microphone signals, and performs an oversight process by adjusting the reference microphone signals in response to detecting wind noise events and scratch events. In another aspect, the ear cup housing has an outside face that is joined to an inside face by a perimeter and the reference microphones are on the perimeter. Other aspects are also described and claimed.

25 Claims, 4 Drawing Sheets

| Event | Detection Strategy | Mitigation Strategy |
|---|---|---|
| Wind Noise | Ref mic coherence + Energy Ratio | Attenuate Ref mic + low shelf cut in filter B |
| Scratch Noise | Ref mic Energy Ratio | Attenuate Ref mic |
| Transparency Howl | Dual single channel howl detection | Notch in filter B |
| Feedback Howl | Full scale howl detection | Reduce feedback gain |

FIG. 4

HEADPHONE WITH MULTIPLE REFERENCE MICROPHONES ANC AND TRANSPARENCY

This application is a continuation of co-pending U.S. patent application Ser. No. 17/901,779, filed Sep. 1, 2022, which is a continuation of U.S. patent application Ser. No. 17/022,954 filed Sep. 16, 2020, now U.S. Pat. No. 11,437,012, which is herein incorporated by reference.

FIELD

The disclosure here generally relates to headphone audio systems, and more particularly to headphones having digital audio signal processing for acoustic noise cancellation, ANC, and transparency using multiple reference microphones in a single ear cup.

BACKGROUND

Headphones enable their wearer to listen to audio programs (e.g., music, podcasts, movie sound tracks, and phone calls) without disturbing others who are nearby. Different headphone types include over-ear, on-ear, loose fitting earbud, and sealing in-ear. Headphones have varying amounts of passive sound isolation against ambient noise, depending on their materials and how closely they fit the wearers head or ear. But in most instances there is some leakage of the ambient noise into the ear that can be heard by the wearer. A technique known as acoustic noise cancellation or active noise control, ANC, can be used to drive a speaker of the headphone to generate a sound field that is electronically designed to destructively interfere with the leaked ambient sound, in order to create a quiet region at the wearers ear drum. Another technique referred to here as (active) transparency can be used to drive the speaker of the headphone to actually reproduce the ambient sound. Transparency is useful in situations where the passive sound isolation is particularly strong yet the wearer sometimes also prefers to hear their ambient environment (without having to remove the headphone.)

SUMMARY

One aspect of the disclosure here is a headphone in which an ear cup housing has an outside face that is joined to an inside face by a perimeter. Several reference microphones are located on the perimeter of the ear cup housing, while an error microphone and a speaker are located on the inside face of the ear cup housing. A processor is configured to i) drive the speaker for acoustic noise cancellation, ANC by processing reference microphone signals and an error microphone signal, from the reference microphones and the error microphone, and ii) drive the speaker for transparency (to reproduce ambient sounds), by processing the reference microphone signals. The transparency and ANC functions perform better due to the multiple reference microphones picking up the ambient sound including sound from directional sources, especially in the case of at least three and no more than four reference microphones. The reference microphones may all be located on the perimeter. The processor may perform an oversight process to further ensure that the ANC and transparency functions can take full advantage of the diversity in the reference microphones.

In another aspect, a headphone has several reference microphones, an error microphone and a speaker, all in its ear cup housing. A processor i) drives the speaker for acoustic noise cancellation, by processing the reference microphone signals and the error microphone signal, ii) drives the speaker for transparency, by processing the reference microphone signals, and iii) performs an oversight process by adjusting the reference microphone signals automatically in response to detecting wind noise events and scratch events that occur while the ANC function, or the transparency function, is active. This helps the ANC and transparency functions take full advantage of the diversity in the reference microphones.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 4 is a table showing example decision logic used by the oversight process.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
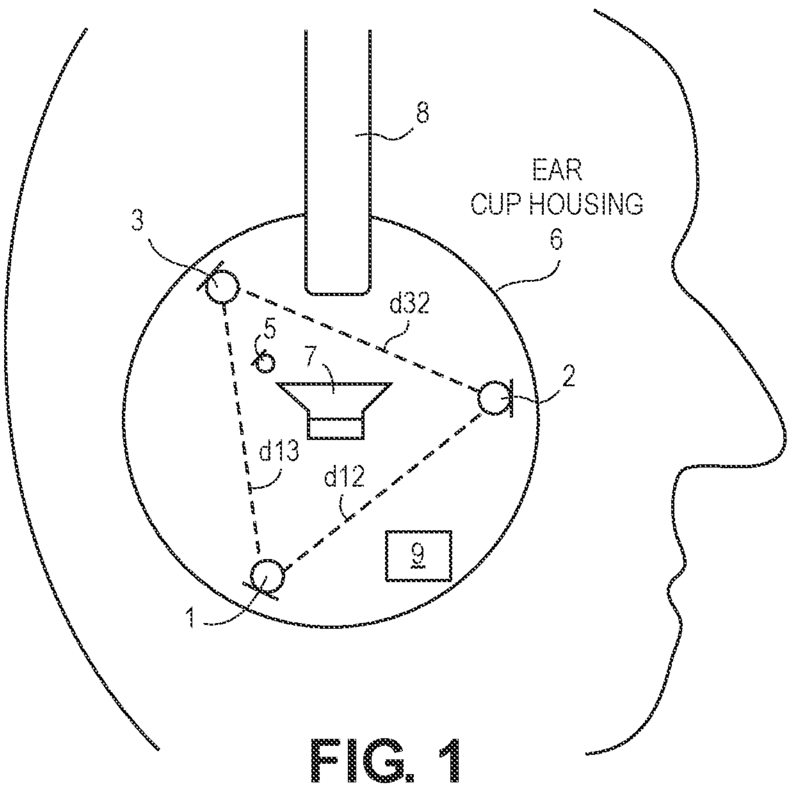
FIG. 1 shows an ear cup housing with three reference microphones.
Figure 2:
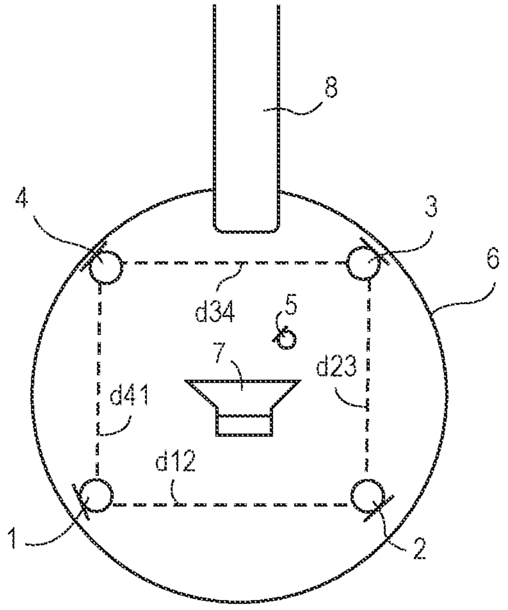
FIG. 2 shows an ear cup housing with four reference microphones.

FIG. 1 and FIG. 2 show an ear cup housing 6 (for example that of a left ear cup or a right ear cup of a headset, also referred to as headphones.) The ear cup housing 6 has an outside face joined to an inside face along a side perimeter of the ear cup housing 6. Note that the term "perimeter" is defined here as encompassing not just a side wall of the housing 6 but also the corner or curve that is partially part of the side wall and partially part of the outside face. There are two or more external or reference microphones integrated in the perimeter of the housing, in this case three reference microphones. For example, as seen in FIG. 1, reference microphone 1, reference microphone 2, and reference microphone 3 are positioned equidistant from each other, e.g., d13=d32=d12, while in the alternative 4-microphone arrangement shown in FIG. 2 there is also reference microphone 4, e.g., d12=d23=d34=d41. The equidistant positioning or spacing of the microphones may achieve a desirable balance between sensitivity and coverage angle for the combined sound pickup response (of the microphones acting together), especially useful for picking up directional sound sources.

The ear cup is shown in FIG. 1 as being worn by its user, positioned against the user's head. The ear cup in this example is one that surrounds the ear, e.g., as an over-the-ear headphone, but it could alternatively be an on-the-ear ear cup. The acoustic port arrangement (or openings for primary sound inlet) for sound pickup by the reference microphones is configured not centrally on a face of the ear cup housing but rather in the perimeter of the ear cup housing 6, for example as shown in the side views of FIGS. 5-7 for various examples of the ear cup. Placing the reference microphones in the perimeter in this manner essentially hides their primary sound inlets from a direct view of the outside face of the ear cup as shown in FIG. 1. This gives an aesthetically clean or simple look to the outside face of the ear cup, while also enabling sound pickup of directional sources or from diverse directions.

Figure 5:
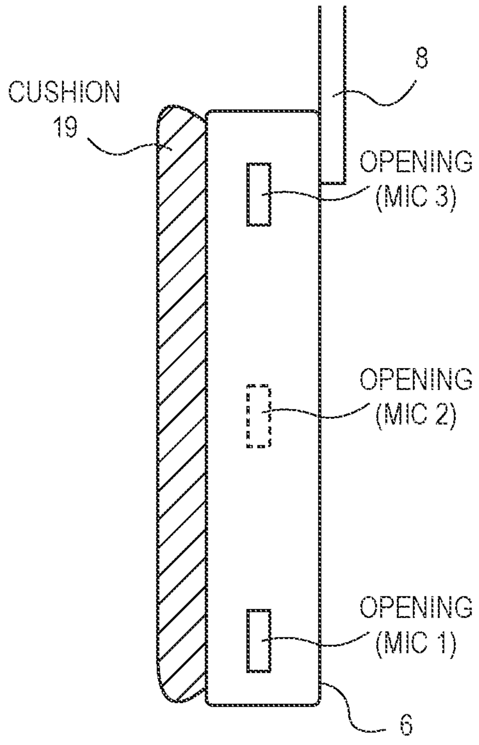
FIG. 5 and FIG. 6 illustrate by way of example the respective primary sound inlet openings for three reference microphones integrated into an ear cup housing.
Figure 6:
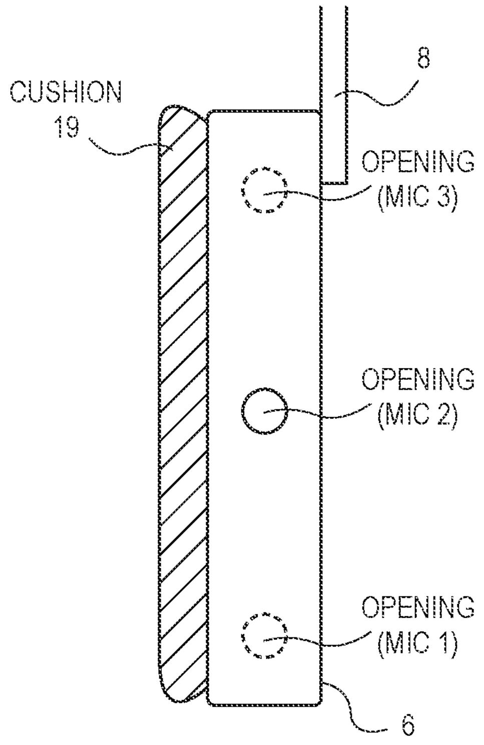
Figure 7:
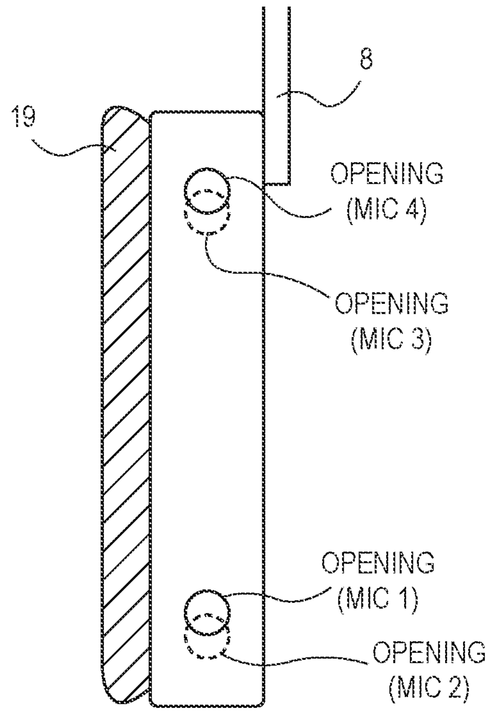
FIG. 7 illustrates by way of example the respective primary sound inlet openings for four reference microphones integrated into an ear cup housing.

As seen in the side views of the ear cup (or direct views of its perimeter) shown in FIGS. 5-7, a cushion 19 may be attached to the inside face of the ear cup housing 6. This makes the headphones more comfortable against the user's head and it may provide greater passive acoustic isolation against ambient sounds. A headband 8 may also be added that physically attaches a right ear cup to a left one (not shown) and enables the pair of ear cups to be kept more easily in position against the left and right ears.

The ear cup housing 6 by virtue of being worn against the head or ear of its wearer serves as a passive acoustic barrier that isolates the wearer from hearing ambient sound. To further reduce any ambient noise (undesired sound) that leaks past this barrier, an acoustic noise cancellation, ANC, subsystem may be added. The ANC subsystem has a digital processor 9 that is configured to (e.g., according to instructions stored in memory—not shown) process the microphone signals as part of an ANC algorithm that produces anti-noise by driving an earpiece speaker 7 (one or more earpiece speakers 7) that are in the inside face of the ear cup housing 6. This aspect is further described below in connection with FIG. 3. The ANC algorithm electronically designs the anti-noise to destructively interfere with or cancel any ambient noise that has leaked past the ear cup housing into the wearers ear. In some instances, a feedback signal from an internal or error microphone 5 may be used to improve the performance of the ANC subsystem (thought this aspect is not illustrated in FIG. 3).

Figure 3:
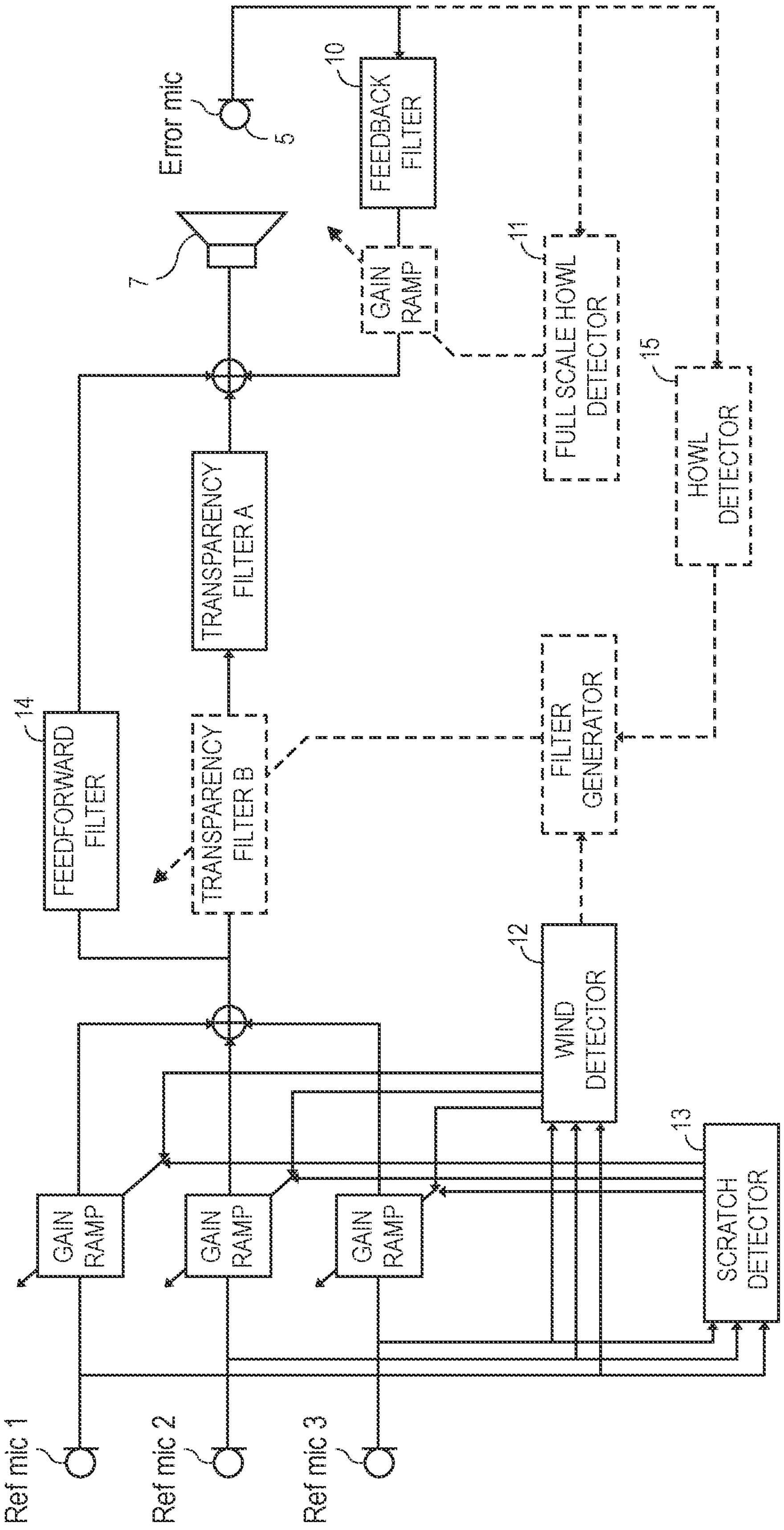
FIG. 3 is a block diagram of part of a headphone audio system in which an oversight process is performed by a processor.

The digital processor 9 may also process the reference microphone signals as part of an ambient sound enhancement subsystem, that reproduces the ambient sound (that is detected by the microphone signals), by driving the earpiece speaker 7. This is also referred to here as a transparency function or transparency subsystem which lets the wearer of the ear cup better hear their ambient environment (to thereby not be completely isolated from their ambient sound environment when wearing headphones.) A feedback signal from the error microphone 5 may be used to improve the users experience during operation of the transparency function. For instance, the output of a feedback filter 10 which is operating upon an audio signal from the error microphone 5 may be added, as shown in FIG. 3, to drive the earpiece speaker 7 in a way that reduces the undesirable occlusion effect experienced by the wearer especially in cases where the ear cup is a closed back design or that otherwise has a tendency to acoustically seal the ear (against the ambient environment). The transparency function is further described below in connection with FIG. 3.

The performance of an ANC subsystem that uses a single reference microphone which is not centrally located on the outside face of the ear cup will suffer due to a directionality issue. For example, consider a directional ambient noise source located in front of the wearer (e.g., a door slam.) The pickup of such ambient noise by a microphone located at the rear of the ear cup is delayed or otherwise degraded, which negatively impacts the performance of the ANC subsystem. To address such a problem, an aspect of the disclosure here is a headphone audio system that has the mechanical arrangement depicted in FIG. 1 in which exactly three reference microphones are positioned not centrally but in and along the perimeter portion of an ear cup housing. The three microphones may be located at the three vertices, respectively, of an equilateral triangle; another aspect is the arrangement depicted in FIG. 4 having exactly four reference microphones positioned in the perimeter portion, and in particular at the four vertices, respectively, of a square. When referring to a microphone as being positioned at a particular location, it is understood that such a reference is also to the primary sound inlet opening or acoustic port for that microphone (formed in the ear cup housing.) FIG. 5 shows a direct view of the perimeter of the ear cup 6 depicted in FIG. 1 (a right ear cup), illustrating one set of example openings (rectangular) for the three microphones, respectively. FIG. 6 illustrates another set of example openings (circular) for the three microphones, respectively. FIG. 7 shows yet another set of example openings, in this case for the 4 microphone aspect of FIG. 2. The diversity in the positions of these openings (or their microphones, respectively) produces early pick up of directional ambient sounds by the microphone that is closest to such sound sources, as compared to the delayed, "downstream" pickup by one or more of the rest of the microphones. This improves the response of the overall sound pickup arrangement to directional sound sources.

In both instances (of FIG. 1 and FIG. 2), the reference microphone signals are summed into a single, reference audio signal that is input to a typical feedforward ANC subsystem (which then drives the earpiece speaker to produce anti-noise.) Such an arrangement yields good ANC performance against both directional ambient noise sources and diffuse ambient noise.

Also, the diversity in the positions of the three or four reference microphones (such as in any of the examples depicted in FIGS. 1-7) enables a more robust audio signal processing wind mitigation algorithm (that is performed by the processor 9.) The wind mitigation algorithm configures the processor 9 to detect which one or more of the microphone signals is suffering from wind noise (wind detector) and in response attenuates (e.g., mutes) that microphone signal but not others. In this manner, the transparency function which may use all of the reference microphone signals at once remains effective even in a windy environment, reproducing less wind noise. Any suitable wind detector 12—see FIG. 3 which is also described below—may be used for this purpose, noting that in one particular example the wind detector 12 performs digital signal processing of signals from the reference microphones 1-3 but not from the error microphone 5.

Another advantageous result associated with the diversely located three or four reference microphones is that they enable a more robust audio signal processing scratch mitigation algorithm. Such an algorithm, also performed by the processor 9, may detect if any one or more of the microphone signals is suffering from a scratch event (scratch detector), e.g., due to the ear cup moving against the wearer's hair, and then in response attenuates (e.g., mutes) the affected one or more microphone signals but not others. Without the scratch mitigation algorithm, the transparency function could reproduce unpleasant sounds, and the ANC subsystem would be less effective in reducing the ambient noise that is heard by the wearer. Any suitable scratch detector 13—see FIG. 3 which is also described below—may be used for this purpose, noting that in one particular example the scratch detector 12 performs digital signal processing of signals from the reference microphones 1-3 but not from the error microphone 5.

An approach somewhat similar to the scratch and wind mitigation algorithms may be used to also mitigate the effect of a reference microphone signal that has been corrupted due to an ultrasonic or out-of-band directional sound source. For example, a motion detector mounted on a ceiling or high on a wall of a room may produce ultrasound at a high enough level that corrupts or may even clip the signal from a reference microphone, especially one that is located at a top of the ear cup. The presence of ultrasound can be detected by analyzing the corrupted reference microphone signal itself, e.g., looking for certain patterns in the frequency components that are above the human hearing range (but that are still picked up by the reference microphones.) In response to detecting the ultrasound, the processor 9 may decide to attenuate (e.g., mute) any one or more corrupted reference microphone signals (but not others).

Turning now to FIG. 3, this is a block diagram of part of a headphone audio system in which an oversight process is performed by the processor 9 (see FIG. 1 or FIG. 2) to improve performance of both an ANC subsystem and a transparency function. The oversight process manages, in real time, which one or more of the several reference microphone signals in an ear cup is adjusted (e.g., either wide band attenuated or spectrally shaped) and by how much, in response to outputs from a scratch detector 13 and a wind detector 12, and optionally an ultrasound detector (not shown). This is done prior to summing the (adjusted) microphone signals into a single reference input of an ANC anti-noise producing filter, referred to as a feedforward filter 14. The sum of the microphone signals is also provided to the input of a transparency filter A, which may reduce noise in the ambient sound that is to be reproduced. The outputs of the feedforward filter 14 and the transparency filter A are then converted into sound by driving the earpiece speaker 7. As seen in the block diagram, each microphone signal path is processed through a respective, variable gain block (referred to here as a "gain ramp"), that can be varied by the oversight process. An example of the decision logic used by the oversight process to vary the gain ramps is given in the table of FIG. 4.

Referring now to the first two rows of the table in FIG. 4, these describe how the processor 9 can be configured to detect wind noise and scratch noise events, for example using the given detection strategies listed in the second column, and respond to those events individually by example mitigation strategies, respectively, given in the third column. A detection strategy used by the wind detector 12 may be to compute coherence values and energy ratios for the reference microphones, and compare them to certain thresholds. For example, up to three coherence values may be computed each between a separate pair of the three reference microphones 1-3; in the case of four reference microphones 1-4, the wind noise detection strategy may compute up to six coherence metrics (each between a separate pair of the four reference microphones.) Similarly, up to three energy ratios may be computed, or six energy ratios for the 4-microphone case. The coherence values and energy ratios may be computed on a per sub-band (frequency domain) basis. If the relevant thresholds are met by a given set of coherence values and energy ratios, indicating that a particular reference microphone signal is now being corrupted by wind noise, then the listed mitigation strategy is executed by the processor 9 which includes attenuating (immediately) the affected reference microphone signal.

A detection strategy used by the scratch detector 13 may be to compute energy ratios for the reference microphones (such as on a per sub-band basis), and compare them to certain thresholds. For example, up to three energy ratios may be computed, or six energy ratios for the 4-microphone case. If the relevant thresholds are met by a given set of energy ratios, indicating that a particular reference microphone signal is now being corrupted by scratch noise, then the listed mitigation strategy is executed by the processor 9 which includes attenuating (immediately) the affected reference microphone signal.

In one aspect, the oversight process compensates for any one or more individual microphone signal gain reductions, so as to not unduly reduce the power of the sum of all of the microphone signals. For example, if a gain (either wide band or sub-band) on a particular microphone signal is to be reduced (e.g., muted) in response to a scratch event or wind event being detected, then the oversight process may respond by also increasing a corresponding gain (either wide band or a corresponding sub-band) on one or more of the other microphone signals. The amount of the gain compensation may be in relation to or depending on the amount of the reduction. This helps reduce if not minimize the impact of the oversight process, especially for the transparency function (when making the ambient sound that is reproduced by the transparency function remain consistent or uniform during the gain adjustments.) In one aspect, the oversight process could calculate a set of target gains for all of the microphone signals, in response to each scratch event or wind event being detected, that meets a goal of uniform ambient sound reproduction in a particular frequency band, e.g., if each of the three reference microphones 1-3 produces a power of 1 and the signal from one of them is to be reduced to 0.5 due to a scratch or wind event, then the signals from the other two microphones are increased to 1.25 each.)

In one aspect, the gain adjustments made by any one or more of the gain ramp blocks in the reference microphone signal paths are frequency selective or per sub-band (instead of being wide band or full band.) For instance, the gain ramp blocks may be low frequency shelf filters. A low (frequency) shelf filter can, upon command, either cut or boost frequencies below its fc, cutoff frequency, but above fc the filter will pass its input audio signal without gain adjustment. In such cases, the compensation aspect described above may be applied as follows. Consider the case where the oversight process decides to command a cut to the low shelf filter (in the gain ramp block) of reference mic 1; the compensation capability in that case will also command a related boost to the low shelf filters of reference microphone 2 and reference microphone 3. This low shelf behavior is consistent with the fact that the reference microphones are positioned in a single ear cup and as such, despite their diversity in location, will have similar phase response to low frequency sound whose wavelength is large compared to the spacing between the reference microphones in a given ear cup.

Still referring to FIG. 3 and the decision logic table in FIG. 4, these figures illustrate yet another optional aspect of the oversight process, namely the suppression of howl through the addition of a full scale howl detector 11 and its associated gain ramp block which acts on the audio signal feedback path from the error microphone 5. The full scale howl detector 11 adjusts the so-called feedback gain of the feedback signal, which in this case is at the output of the feedback filter 10, responsive to having detected a howl event when processing the audio signal from the error microphone 5. As reflected in the fourth row of the table in FIG. 4, this gain adjustment is in most instances an attenuation that is applied to the feedback audio signal path (by the separate gain ramp block) either as a wide-band gain or on a per sub-band (frequency selective) basis, in response to having detected a feedback howl event using a full scale howl detection process.

Another optional aspect of the oversight process, using FIG. 3 and FIG. 4 to illustrate, is the suppression of transparency howl. The transparency howl suppression algorithm operates in the form of a howl detector 15 and a transparency filter B. The transparency filter B acts upon the audio signal path through the transparency filter A (described above). A filter generator process determines (e.g., computes) the digital filter coefficients that define the transfer function of the transparency filter B. These are determined in accordance with a detected transparency howl event. As seen in the third row of the table in FIG. 4, the mitigation strategy for responding to a detected transparency howl event is to add a notch to (or deepen an existing one in) the frequency response of the transparency filter B (notch filter). The howl detector 15 may use a so-called dual single channel howl detection strategy. There, the processor 9 is configured to detect a howl condition based on not just its processing of the audio signal from the error microphone 5 which is in the same ear cup as the speaker 7, but also based on an audio signal from another error microphone that is inside the complementary ear cup (not shown). Such a dual, single channel detection strategy may compare spectral content of the error microphones that are in the two ear cups, so as to more reliably detect the type of howl that can be suppressed by adding or deepening a notch filter (in the transparency filter B.) Note that some of the processing of the audio signal from the error microphone that is the other ear cup, such as spectral content detection of howl, could be performed by a processor in the other ear cup (rather than by the processor 9), and the results of such processing could be transmitted from the other ear cup to the processor 9.

In yet another aspect of the oversight process, also illustrated in FIG. 3 and FIG. 4, the transparency filter B may be "shared" by the wind mitigation algorithm and the transparency howl suppression algorithm. This is depicted by the two arrows that point into the filter generator block, from the wind detector 12 and the howl detector 15. In this aspect, the filter generator determines (e.g., computes) the digital filter coefficients that define the transfer function of the transparency filter B, in accordance with both a detected wind noise event and a detected transparency howl event. In the case of detected wind noise, referring now to the first row of the table in FIG. 4, the transparency filter B is configured (by the filter generator) to have a low shelf cut filter. In the case of detected transparency howl, referring now to the third row of the table in FIG. 4, the transparency filter B is configured (by the filter generator) to also have a notch filter (e.g., centered on a dominant frequency component of the detected howl.)

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A headphone comprising:

an ear cup housing having an outside face, an inside face and a perimeter sidewall, the perimeter sidewall is between the outside face and the inside face;

at least three external microphones integrated in the ear cup housing that are disposed on the perimeter sidewall of the ear cup housing;

an internal microphone and a speaker that are disposed on the inside face of the ear cup housing; and processing circuitry configured to i) drive the speaker for acoustic noise cancellation by processing a) at least one external microphone signal from the at least three external microphones and b) an internal microphone signal from the internal microphone, and ii) drive the speaker for transparency by processing at least one external microphone signal from the at least three external microphones.

2. The headphone of claim 1 wherein the outside face has no sound inlets for microphones, the headphone further comprising a cushion attached to the inside face.

3. The headphone of claim 2 wherein the at least three external microphones are three external microphones.

4. The headphone of claim 3 wherein the three external microphones are positioned at vertices, respectively, of an equilateral triangle.

5. The headphone of claim 2 wherein the at least three external microphones are four external microphones.

6. The headphone of claim 5 wherein the four external microphones are positioned at vertices, respectively, of a square.

7. The headphone of claim 1 wherein for acoustic noise cancellation audio output, the processing circuitry is configured to combine at least two external microphone signals from the at least three external microphones into a single reference input of an anti-noise producing filter.

8. The headphone of claim 7 wherein for transparency audio output, the processing circuitry is configured to combine at least two external microphone signals from the at least three external microphones into a single input of a first transparency filter.

9. The headphone of claim 8 wherein the processing circuitry is configured to adjust one or more of the at least two external microphone signals in response to detecting a wind noise event or a scratch event.

10. The headphone of claim 9 wherein the processing circuitry is detecting the wind noise event by detecting that one or more affected external microphone signals from the at least three external microphones are affected by wind noise, and in response adjusts the one or more affected external microphone signals by attenuating only the one or more affected external microphone signals and no other signals from the at least three external microphones.

11. The headphone of claim 8 further comprising a second transparency filter in cascade with the first transparency filter, wherein the processing circuitry upon detecting that one or more external microphone signals of the at least three external microphones are affected by wind noise adjusts the second transparency filter.

12. The headphone of claim 11 wherein the second transparency filter comprises a low frequency shelf cut filter.

13. The headphone of claim 11 wherein the processing circuitry is detecting the scratch event by detecting an affected one or more external microphone signals from the at least three external microphones are affected by scratch noise and in response adjusts said affected one or more external microphone signals by attenuating the affected one or more external microphone signals and not others.

14. The headphone of claim 13 further comprising a second transparency filter in cascade with the first transparency filter, wherein the processing circuitry upon detecting that one or more external microphone signals from the at least three external microphones are affected by scratch noise adjusts the second transparency filter.

15. The headphone of claim 14 wherein the second transparency filter comprises a notch filter.

16. A headset comprising:

a first internal microphone, a first speaker, one or more first external microphones, and a first processing circuitry in a housing of a first ear cup; and a second internal microphone, a second speaker, a plurality of second external microphones, and a second processing circuitry in a housing of a second ear cup;

the first processing circuitry being configured to produce a) ANC audio output for acoustic noise cancellation based on i) a first external microphone signal from the one or more first external microphones and ii) a first internal microphone signal from the first internal microphone, and b) transparency audio output for transparency based on the first external microphone signal, and the first processing circuitry is further configured to determine a digital filter in the transparency audio output, based on i) the first processing circuitry processing the first internal microphone signal and ii) a result of the second processing circuitry processing a second internal microphone signal from the second internal microphone, wherein the result is transmitted from the second ear cup to the first processing circuitry of the first ear cup.

17. The headset of claim 16 wherein the first processing circuitry determines the digital filter based on processing i) the first internal microphone signal and ii) the result of the second processing circuitry processing the second internal microphone signal, to detect a howl condition.

18. The headset of claim 17 wherein the first processing circuitry determines the digital filter based on comparing spectral content of the first internal microphone signal with spectral content of the second internal microphone signal.

19. The headset of claim 16 wherein the first processing circuitry determines the digital filter based on comparing spectral content of the first internal microphone signal with spectral content of the second internal microphone signal.

20. A headphone comprising:

an ear cup housing having an outside face, an inside face and a perimeter sidewall, wherein the outside face is spaced apart from the inside face by the perimeter sidewall;

at least three external microphones integrated in the ear cup housing that are disposed on the perimeter sidewall of the ear cup housing;

an internal microphone and a speaker that are disposed on the inside face of the ear cup housing; and processing circuitry configured to i) drive the speaker for acoustic noise cancellation by processing a) at least one external microphone signal from the at least three external microphones and b) an internal microphone signal from the internal microphone, and ii) drive the speaker for transparency by processing at least one external microphone signal from the at least three external microphones.

21. The headphone of claim 20 wherein the outside face has no sound inlets for microphones, the headphone further comprising a cushion attached to the inside face.

22. The headphone of claim 20 wherein the at least three external microphones are three external microphones.

23. The headphone of claim 22 wherein the three external microphones are positioned at vertices, respectively, of an equilateral triangle.

24. The headphone of claim 20 wherein the at least three external microphones are four external microphones.

25. The headphone of claim 24 wherein the four external microphones are positioned at vertices, respectively, of a square.

* * * * *